US008818089B2

(12) United States Patent
Choi et al.

(10) Patent No.: US 8,818,089 B2
(45) Date of Patent: Aug. 26, 2014

(54) DEVICE AND METHOD OF REMOVING CHROMATIC ABERRATION IN IMAGE

(75) Inventors: Eun-Cheol Choi, Changwon (KR); Jae-Cheol Lee, Changwon (KR); Moon-gi Kang, Seoul (KR); Hee Kang, Seoul (KR)

(73) Assignees: Samsung Techwin Co., Ltd., Changwon (KR); Industry-Academic Cooperation Foundation, Yonsei University, Seoul (KR)

( * ) Notice: Subject to any disclaimer, the term of this patent is extended or adjusted under 35 U.S.C. 154(b) by 50 days.

(21) Appl. No.: 13/550,796

(22) Filed: Jul. 17, 2012

(65) Prior Publication Data
US 2013/0039573 A1    Feb. 14, 2013

(30) Foreign Application Priority Data
Aug. 8, 2011    (KR) .................. 10-2011-0078750

(51) Int. Cl.
*G06K 9/00*    (2006.01)

(52) U.S. Cl.
USPC ........................... 382/165; 382/162; 382/163

(58) Field of Classification Search
USPC ................... 382/162, 163, 165, 167, 157; 348/223.1, 581, 458, E5.062; 358/3.26, 358/1.9; 702/127
See application file for complete search history.

(56) References Cited

U.S. PATENT DOCUMENTS

| 5,495,429 | A * | 2/1996 | Craven et al. | ................ 702/127 |
|---|---|---|---|---|
| 6,912,014 | B2 * | 6/2005 | Kondo et al. | ................ 348/581 |
| 7,577,292 | B2 | 8/2009 | Kang | |
| 7,656,437 | B2 | 2/2010 | Yamada et al. | |
| 7,792,357 | B2 | 9/2010 | Kang | |
| 8,305,645 | B2 * | 11/2012 | Gotoh et al. | ................ 358/3.26 |
| 2008/0170248 | A1 | 7/2008 | Kang et al. | |
| 2010/0027886 | A1 | 2/2010 | Kang et al. | |
| 2010/0110238 | A1 | 5/2010 | Kang et al. | |
| 2010/0303350 | A1 | 12/2010 | Demadolx | |

FOREIGN PATENT DOCUMENTS

| EP | 1669792 | * | 6/2006 | ............. G02B 27/01 |
|---|---|---|---|---|
| KR | 10-2007-0026288 A | | 3/2007 | |
| KR | 10-2008-0080107 A | | 9/2008 | |
| KR | 10-0866490 B1 | | 11/2008 | |
| KR | 10-2010-0013173 A | | 2/2010 | |
| KR | 10-2010-0050904 A | | 5/2010 | |
| KR | 10-2010-0050905 A | | 5/2010 | |

* cited by examiner

*Primary Examiner* — Anh Do
(74) *Attorney, Agent, or Firm* — Sughrue Mion, PLLC (57) ABSTRACT

A device and method of removing chromatic aberration which occurs in an image generated by capturing a target subject. The chromatic aberration removing device includes a chromatic aberration region detecting unit which detects a chromatic aberration occurrence region in an input image, a coefficient calculating unit which calculates a minimizing pixel value which minimizes a difference between sizes, numbers of pixels or intensities of edges of red, green, and blue (RGB) channels of the chromatic aberration occurrence region, a chroma signal processing unit which removes chromatic aberration in the chromatic aberration occurrence region, and a purple fringing removing unit which removes purple fringing.

12 Claims, 7 Drawing Sheets
(3 of 7 Drawing Sheet(s) Filed in Color)

DEVICE AND METHOD OF REMOVING CHROMATIC ABERRATION IN IMAGE

CROSS-REFERENCE TO RELATED PATENT APPLICATION

This application claims priority from Korean Patent Application No. 10-2011-0078750, filed on Aug. 8, 2011, in the Korean Intellectual Property Office, the disclosure of which is incorporated herein in its entirety by reference.

BACKGROUND

1. Field

Apparatuses consistent with exemplary embodiments related to image communication, and more particularly, to removing chromatic aberration that occurs in an image generated by capturing a target subject.

2. Description of the Related Art

Recently, digital cameras have been improved with respect to technical aspects due to much demand and technical development. In particular, sensors have been improved with respect to a resolution aspect. However, the improved resolution causes aberration occurring due to a lens to be more recognizable. Particularly, chromatic aberration indicating incorrect color combination around an edge of an image is easily recognized, and thus, can be a problem. The chromatic aberration occurs if different wavelength components of light do not reach exactly at a focal surface of a camera because of a diffraction rate difference between the different wavelengths when light passes through a lens of the camera.

Figure 1A:
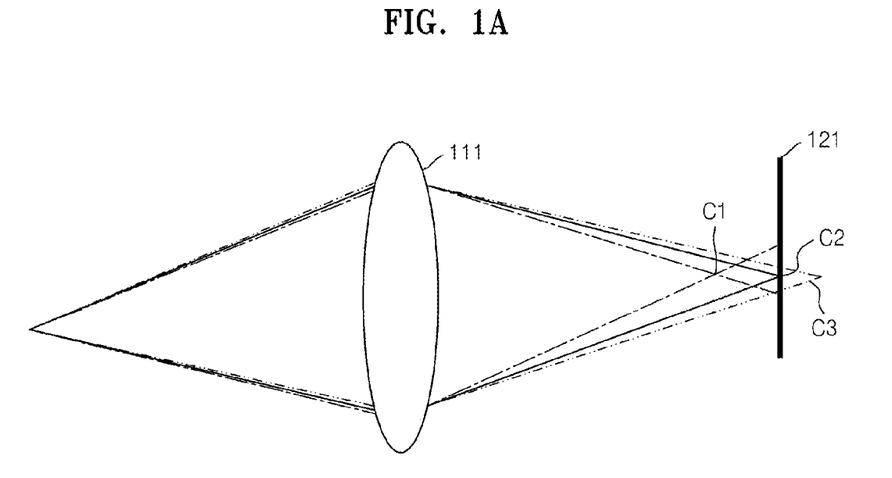
FIGS. 1A and 1B are diagrams describing magnification chromatic aberration and axial chromatic aberration, respectively.
Figure 1B:
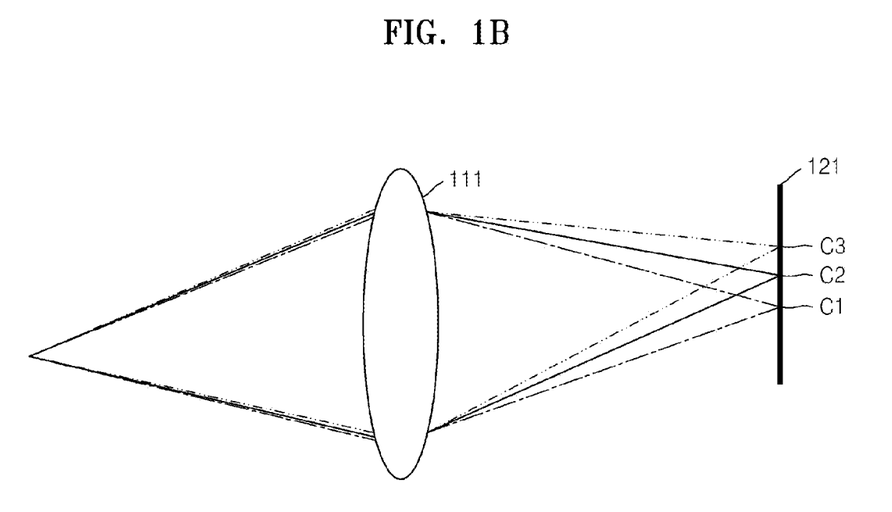

Depending on how the chromatic aberration occurs, the chromatic aberration may be classified into axial chromatic aberration and magnification chromatic aberration. As illustrated in FIG. 1A, the magnification chromatic aberration causes geometrical distortion of an image since a diffraction rate of light that passes through a lens 111 varies according to wavelengths of the light, such that focuses C1, C2, and C3 are formed at different positions with respect to an imaging surface 121, and thus, a size of the image varies according to channels. That is, a far edge portion of the image is greatly affected by the different diffraction rate, and thus, its defect level due to the magnification chromatic aberration is great. As illustrated in FIG. 1B, the axial chromatic aberration occurs since a diffraction rate of light that passes through a lens 111 varies according to wavelengths, and thus, distances between the lens 111 and focuses C1, C2, and C3 are different. As a result thereof, the axial chromatic aberration causes a blur since the focuses C1, C2, and C3 of different wavelengths do not match on the imaging surface 121. The aforementioned chromatic aberrations commonly cause a mismatch of edges of RGB channels, and thus, generate chromatic defects around the edges. In a digital image, purple fringing additionally occurs together with the defects due to the chromatic aberrations. The purple fringing indicates a phenomenon in which a purple color widely spreads over a region adjacent to a highly bright region. The phenomenon mainly occurs in an image obtained by using a charge coupled device (CCD) sensor rather than in an image obtained by using a complementary metal oxide semiconductor (CMOS) sensor, and occurs due to an effect of an ultraviolet ray incident on a sensor. Although a chromatic characteristic due to the phenomenon is similar to that of the chromatic aberrations, the phenomenon occurs in a wider region, and thus, it is difficult to efficiently remove the phenomenon by using a related art chromatic aberration removal technique.

In order to remove the chromatic characteristic due to the chromatic aberrations, most related art technologies perform correction by extracting representative coefficients of a lens, and then, changing an image size according to each channel. The related art technologies are divided into methods of previously extracting coefficients by using a pattern image, and methods of performing correction without an additional image. However, the methods do not consider a blur occurring due to the axial chromatic aberration and also do not consider the purple fringing, and thus, the methods may correct only defects occurring due to the magnification chromatic aberration. In order to complement such methods, recently, there are provided methods of removing the chromatic aberrations by performing filtering. The methods involve removing the chromatic aberrations by using a total sum of weights of pixels adjacent to a current pixel, and according to the methods, the chromatic aberrations are removed in a manner in which a weight of pixels that are greatly affected by the chromatic aberration is decreased, and a weight of pixels that are less affected by the chromatic aberration is increased. By doing so, not only the magnification chromatic aberration but also the axial chromatic aberration and the purple fringing are removed. However, due to limitation of the filtering, the chromatic aberration and purple fringing are not effectively removed.

SUMMARY

One or more exemplary embodiments provide a device and method of effectively removing chromatic aberration and purple fringing.

According to an aspect of an exemplary embodiment, there is provided a chromatic aberration removing device including a chromatic aberration region detecting unit which detects a chromatic aberration occurrence region in an input image; a coefficient calculating unit which calculates a minimizing pixel value which minimizes a difference between sizes, numbers of pixels or intensities of edges of red, green, and blue (RGB) channels of the chromatic aberration occurrence region; and a chroma signal processing unit which removes chromatic aberration in the chromatic aberration occurrence region by using the minimizing pixel value and chroma values of pixels adjacent to the chromatic aberration occurrence region. The chromatic aberration removing device may further include a purple fringing removing unit which removes purple fringing by using given pixel values as weights, wherein the given pixel values comprise a pixel value which is restored from pixels adjacent to pixels having a purple fringing chroma characteristic, and a pixel value which is interpolated from a previous image frame of an image frame having the purple fringing.

The coefficient calculating unit may estimate a minimizing coefficient which minimizes a difference between a size, number or intensity of pixels of the edge of the R channel and a size, number or intensity of pixels of the edge of the B channel, and then, calculates the minimizing pixel value by using the minimizing coefficient.

The chroma signal processing unit may include a channel moving unit which moves the edge of the R channel and the edge of the B channel in the chromatic aberration occurrence region to a position corresponding to the minimizing pixel value; and a chroma interpolating unit which obtains chroma values which are estimated in a case where the chromatic aberration does not occur in pixels of the RB channels included in the chromatic aberration occurrence region, by using chroma values of pixels which are from among adjacent pixels of the pixels of the RB channels included in the chromatic aberration occurrence region and which are not affected by the chromatic aberration, and replaces chroma values of the pixels of the RB channels in the chromatic aberration occurrence region with the estimated chroma values.

According to an aspect of another exemplary embodiment, there is provided a method of removing chromatic aberration, the method including (a) detecting a region of an input image in which chromatic aberration occurs; (b) estimating a minimizing coefficient which minimizes a difference between a size, number or intensity of pixels of an edge of a red (R) channel and a size, number or intensity of pixels of an edge of a blue (B) channel; (c) calculating a minimizing pixel value which minimizes a difference between sizes, numbers of pixels or intensities of edges of red, green and blue (RGB) channels, by using the estimated coefficient; (d) moving the edges of the R channels and the edges of the B channels in the chromatic aberration occurrence region, to a position which corresponds to the minimizing pixel value; and (e) obtaining chroma values which are estimated in a case where the chromatic aberration does not occur in pixels of the RB channels included in the chromatic aberration occurrence region, by using chroma values of pixels which are from among adjacent pixels of the pixels of the RB channels included in the chromatic aberration occurrence region and which are not affected by the chromatic aberration, and then, replaces chroma values of the pixels of the RB channels included in the chromatic aberration occurrence region with the estimated chroma values.

The above method may further include an operation of (f) removing purple fringing by using given pixel values as weights, wherein the given pixel values comprise a pixel value which is restored from pixels adjacent to pixels having a purple fringing chroma characteristic, and a pixel value which is interpolated from a previous image frame of an image frame having the purple fringing.

BRIEF DESCRIPTION OF THE DRAWINGS

The patent or application file contains at least one drawing executed in color. Copies of this patent or patent application publication with color drawings will be provided by the Office upon request and payment of the necessary fee. The above and other features will become more apparent by describing in detail exemplary embodiments thereof with reference to the attached drawings, in which:

FIG. 6A illustrates an example in which color fringing occurs in an edge of a B channel due to chromatic aberration.

DETAILED DESCRIPTION

Hereinafter, the exemplary embodiments will be described in detail with reference to the attached drawings. Like reference numerals in the drawings denote like elements.

Figure 2:
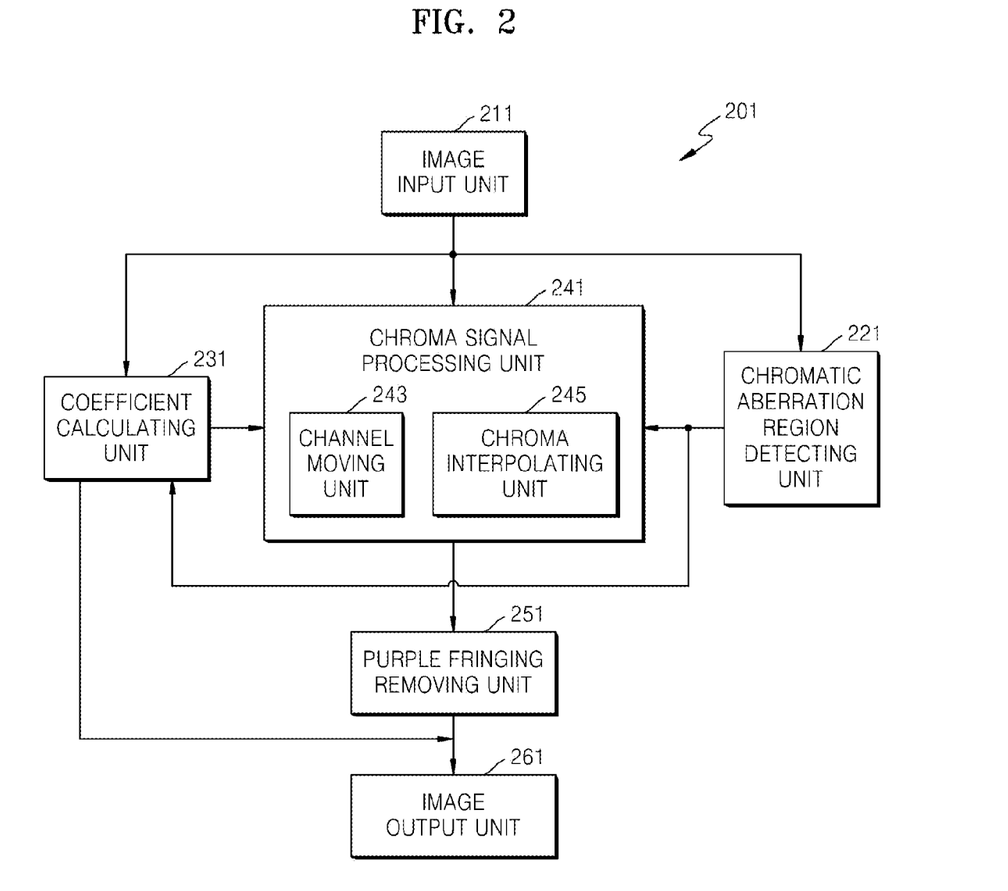
FIG. 2 is a block diagram of a chromatic aberration removing device according to an exemplary embodiment.

FIG. 2 is a block diagram of a chromatic aberration removing device 201 according to an exemplary embodiment. Referring to FIG. 2, the chromatic aberration removing device 201 includes an image input unit 211, a chromatic aberration region detecting unit 221, a coefficient calculating unit 231, a chroma signal processing unit 241, a purple fringing removing unit 251, and an image output unit 261.

The image input unit 211 inputs an image from an external source.

The chromatic aberration region detecting unit 221 receives an image output from the image input unit 211, and detects a region in the image in which chromatic aberration occurs. Because chromatic aberration generally occurs in edge regions of a red (R) channel, a green (G) channel, and a blue (B) channel, the detection of a chromatic aberration region means detection of the edge regions of the RGB channels.

The coefficient calculating unit 231 calculates a pixel value that minimizes a difference between sizes of edges of the RGB channels in a chromatic aberration occurrence region. That is, first, the coefficient calculating unit 231 estimates a coefficient that minimizes a difference between a size of pixels of an edge of an R channel and a size of pixels of an edge of a B channel, and then, calculates the pixel value that minimizes the difference between the sizes of the edges of the RGB channels, by using the coefficient. Here, the size of pixels of an edge of the R channel or B channel may be replaced by a number of the pixels or intensities of the pixels.

Figure 3A:
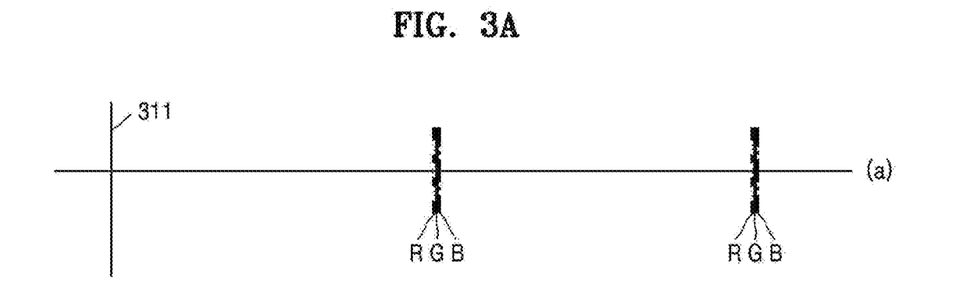
FIGS. 3A and 3B illustrate shapes of ideal edges of red, green, and blue (RGB) channels, and shapes of RGB channels in which chromatic aberration occurs, respectively, according to an exemplary embodiment.
Figure 3B:
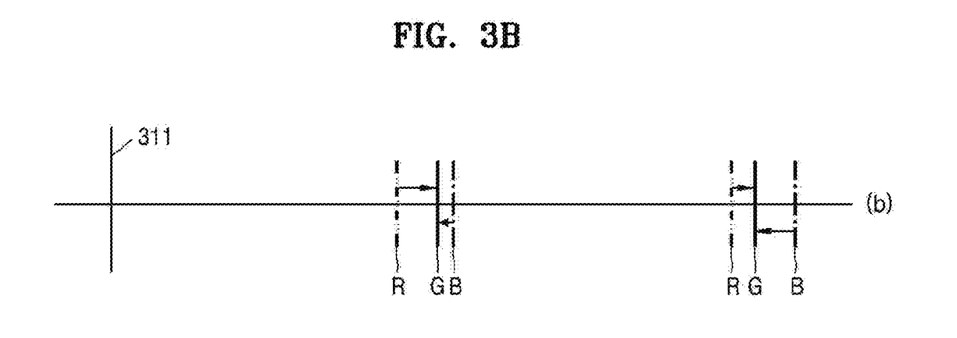

As a distance from an optical center 311 (refer to FIGS. 3A and 3B) of an image is increased, sizes of the RGB channels become different. FIG. 3A illustrates shapes of ideal edges of the RGB channels. That is, regardless of the distance from the optical center 311, the ideal edges of the RGB channels are all positioned within a relatively close range. However, when chromatic aberration occurs, as illustrated in FIG. 3B, positions of the edges of the RGB channels vary according to the distance. In order to move pixels to positions determined to be their original positions, the coefficient calculating unit 231 estimates a level of the difference between the sizes of the edges of the RGB channels, and then, calculates the pixel value that minimizes the difference between the sizes of the edges of the RGB channels.

Figure 4A:
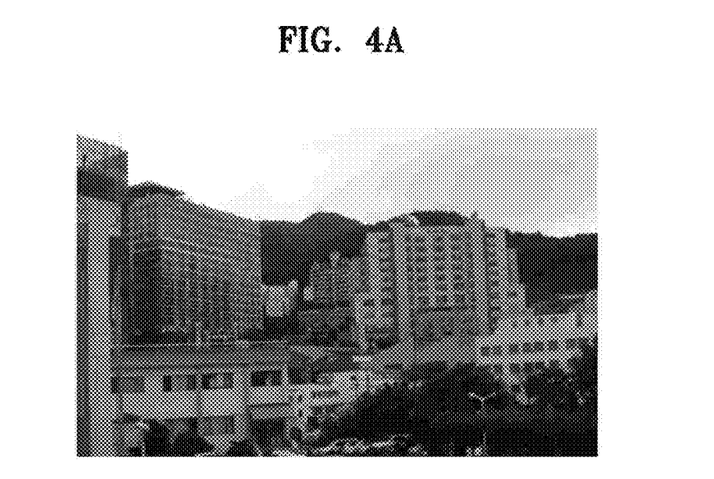
FIG. 4A illustrates a general image.
Figure 4B:
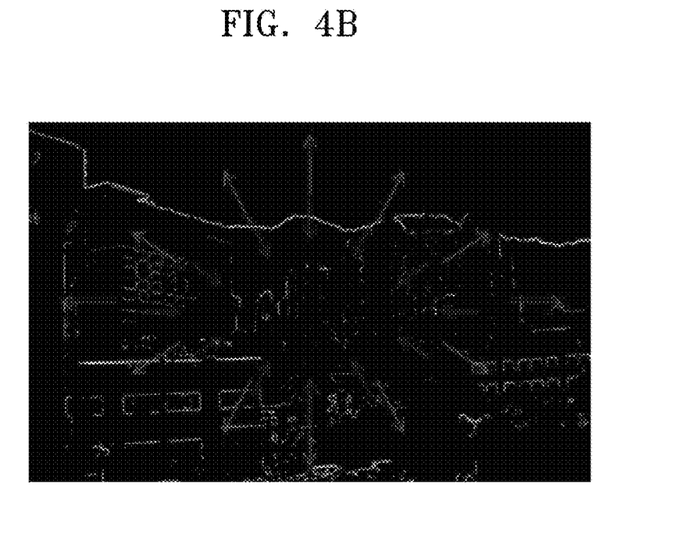
FIG. 4B illustrates an edge map of the image.

In order to estimate a coefficient for correction of the sizes of the RGB channels, an edge region of an image that is input from an external source is used. FIG. 4A illustrates a general image, and FIG. 4B illustrates an edge map of the image. In the edge map of FIG. 4B, portions with a relatively bright color indicate edges of the image, and with respect to an intense edge of the image, a position of the edge slightly varies for each channel due to chromatic aberration. Thus, by estimating the coefficient that minimizes the difference between the edges of the RGB channels, the variation may be corrected. According to the present embodiment, Equation 1 that satisfies Expression 1 is calculated, so that the coefficient is estimated by minimizing a difference between a size value of an edge of one channel and a size value of an edge of another channel, and then pixel values are calculated by using the coefficient. That is, pixels (i',j') that minimize a difference between a pixel value of an edge of a G channel (I'_{G}) and a pixel value of an edge of a R channel (I'_{R}) are detected.

$$\min\|I_G(i,j)-I_R(i',j')\|, \min\|I_G(i,j)-I_B(i',j')\|, \text{ where } (i,j) \in \text{Edge region} \quad \text{[Expression 1]}$$

$$(i',j')=(i,j)(a_0+a_1 r(i,j)+a_1 r(i,j)^2+a_1 r(i,j)^3) \quad \text{[Equation 1]}$$

(i,j) indicates vertical and horizontal coordinates of an edge pixel, and I(i,j) indicates a pixel value. Also, r(i,j) indicates a distance between the edge pixel (i,j) and an optical center (refer to the optical center 311 of FIGS. 3A and 3B) of an image. Estimation coefficients $a_0, a_1, a_2, a_3$ in Equation 2 may be obtained by using a numerical analysis method. Because the estimation coefficients $a_0, a_1, a_2, a_3$ are not changed as long as an optical characteristic such as magnification of an optical system mounted in a digital camera is not changed, the estimation coefficients $a_0, a_1, a_2, a_3$ are calculated only when an optical characteristic is changed.

Figure 5:
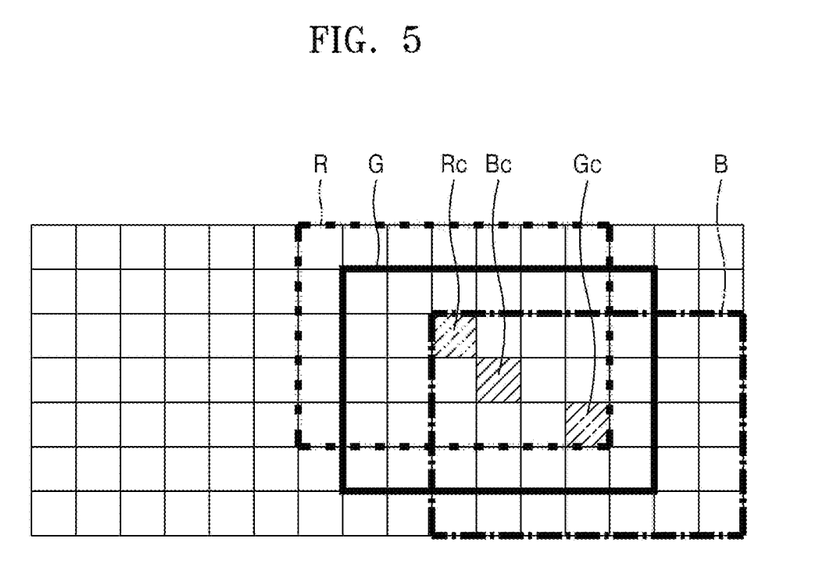
FIG. 5 is a diagram describing a method of using coordinates in a filtering operation, wherein the coordinates are obtained by using Equation 1, according to an exemplary embodiment.

FIG. 5 is a diagram describing a method of using coordinates in a filtering operation, wherein the coordinates are obtained by using Equation 2. That is, by using coordinates and a distance to an optical center, a distance between a current G channel and an R channel and a distance between the current G channel and a B channel may be calculated. In FIG. 5, the Rc, Bc and Gc indicate centers of R-, B- and G-channel images.

The chroma signal processing unit 241 removes chromatic aberration of a chromatic aberration occurrence region by using the calculated pixel values and chroma values of pixels adjacent to the chromatic aberration occurrence region. The chroma signal processing unit 241 includes a channel moving unit 243 and a chroma interpolating unit 245.

The channel moving unit 243 moves the edges of the R channels and the edges of the B channels, which are included in a chromatic aberration occurrence region, to a position corresponding to the pixel value that minimizes the difference between the sizes of the edges of the RGB channels.

The chroma interpolating unit 245 obtains chroma values Cb' and Cr' that are estimated in a case where chromatic aberration does not occur to pixels of the RB channels included in a chromatic aberration occurrence region, by using chroma values Cb and Cr of pixels that are from among pixels adjacent to the pixels of the RB channels included in the chromatic aberration occurrence region and that are not affected by chromatic aberration. Afterward, the chroma interpolating unit 245 removes chromatic aberration by replacing chroma values of the pixels of the RB channels included in the chromatic aberration occurrence region with the estimated chroma values Cb' and Cr'.

Figure 6A:
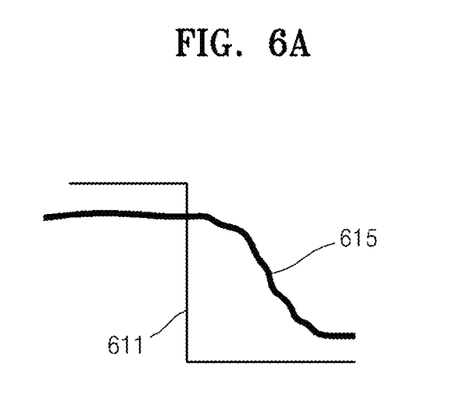
Figure 6B:
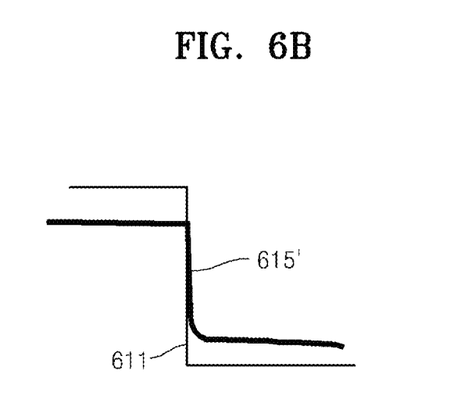
FIG. 6B illustrates an example in which the chromatic aberration in the edge of the B channel is removed, according to exemplary embodiments.

In the present embodiment, Y/Cb/Cr are used as chroma values. FIG. 6A illustrates an example in which an edge 611 of a G channel is sharp whereas color fringing occurs in an edge 615 of a B channel due to chromatic aberration. In this regard, when chromatic aberration exists in a current pixel, if a chroma value Cb' that is estimated in a case where the chromatic aberration does not occur is obtained by using chroma values Cb of adjacent pixels that are not affected by the chromatic aberration, and then, if an original chroma value Cb is replaced with the chroma value Cb', as illustrated in FIG. 6B, the edge 615' of the B channel has a shape similar to the edge 611 of the G channel. This process may be performed according to Equation 2.

$$I'_{Cb}(i,j) = \sum_{(p,q)\in N} \frac{S(p,q)}{w_1(p,q)+w_2(p,q)+w_3(p,q)} I_{Cb}(p,q) \quad \text{[Equation 2]}$$

Here, N indicates a region adjacent to a current pixel. That is, Equation 2 is related to chroma values of adjacent pixels that are weighted and averaged. Here, a switch function S is used to weight and average only same chroma from among a plurality of pieces of chroma of the adjacent pixels. The switch function S performs the aforementioned function by allowing the plurality of pieces of chroma of the adjacent pixels to have 1 in a case of the same chroma and to have 0 in a case of different chroma. Functions w1, w2, and w3 in the denominator of Equation 3 are weights that are used when a new chroma value $I_{Cb}$ is calculated. That is, the function w1 is an absolute value of a difference between slopes of the G and B channels. In a chromatic aberration occurrence region, the difference between the slopes of the G and B channels is great. Thus, by using the function w1 in the denominator, a weight of chroma of a pixel that is estimated to have been affected by chromatic aberration is decreased in the weighting and averaging operations. The function w2 is an absolute value of a slope of a Y channel. In general, a degree of chromatic aberration becomes worse in a region in which brightness sharply fluctuates, and thus, the function w2 is used to decrease a weight of such a region. The function w3 indicates a difference between a Y value of a current pixel and Y values of adjacent pixels, and in this regard, when the function w3 has a great value, it is possible to prevent a chroma of the current pixel, as compared to the adjacent pixels, from fading due to excessive deterioration of a chroma signal of the current pixel. By performing the aforementioned processes, most of chromatic aberrations occurring in an image are removed. A process of filtering a chroma value Cr is the same as a process of obtaining a chroma value Cb, and thus, detailed descriptions thereof are omitted.

Figure 7:
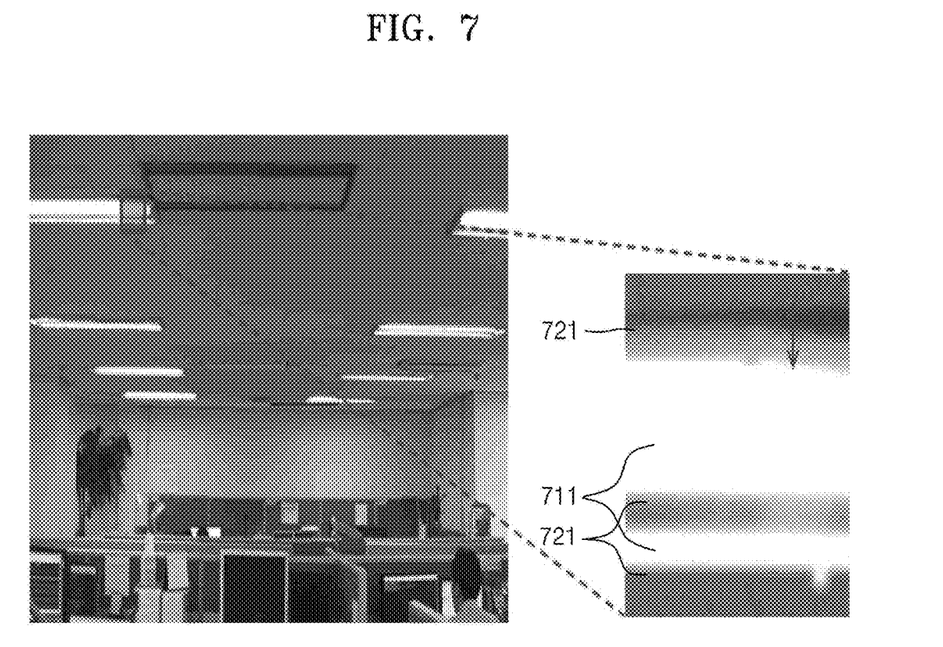
FIG. 7 is an image that shows typical purple fringing, in which a purple-based color widely exists in a region adjacent to a fluorescent lamp.

The purple fringing removing unit 251 removes purple fringing by using pixel values as weights, wherein the pixel values include a pixel value that is restored from pixels adjacent to pixels having a purple fringing chroma characteristic, and a pixel value that is interpolated from a previous image frame of an image frame having the purple fringing. The purple fringing indicates a phenomenon in which a bright region and regions adjacent thereto look purple due to an ultraviolet ray incident on an imaging device and due to a characteristic of the imaging device. The purple fringing occurs in a wider region than axial chromatic aberration or magnification chromatic aberration. FIG. 7 is an image that shows typical purple fringing, in which a purple-based color, that is, purple fringing 721, widely exists in a region adjacent to a fluorescent lamp 711. Because the purple fringing 721 occurs in a wide region, there is a limitation in removing the purple fringing 721 by using only image data of a current memory in a hardware system by using a line memory. In order to overcome the limitation, according to the present embodiment, an image of a previous image frame is used. That is, because it is difficult to exactly recognize a level and a location of occurrence of the purple fringing 721 in a current image, a purple fringing occurrence region is roughly detected in a previous image frame, and then, information of the purple fringing occurrence region is used when the purple fringing 721 is processed in the current image.

Figure 8:
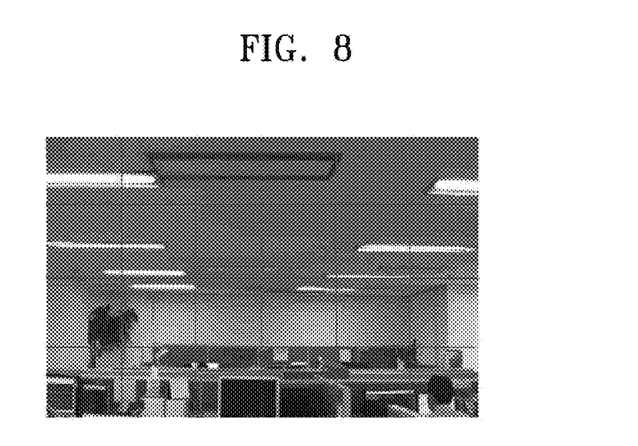
FIG. 8 illustrates a previous image frame that is divided into a plurality of blocks.

In more detail, a previous image frame is divided into a plurality of blocks, as illustrated in FIG. 8. The number of pixels in each block that have brightness equal to or greater than a predetermined level is counted and stored. In the present embodiment, a brightness value of a Y channel is used. By doing so, it is possible to obtain an image corresponding to a small saturation region. After the image is obtained from the previous image frame, the image is enlarged in a current image frame via interpolation.

Afterward, a chromatic characteristic of the purple fringing 721 is searched for in the current image frame. In general, the purple fringing 721 exhibits a purple-based chromatic defect, and thus, in the present embodiment, a purple-based chromatic characteristic is determined by using Expression 2.

$$I_{Cb}>0 \text{ and } I_{Cr}>-th \text{ and } I_{Cb}>I_{Cr}$$

$$I_{Cb}(i,j)>I_{Cb}(p,q) \text{ and } I_{Cb}(p,q) \leq I_{Cr}(p,q), \quad \text{[Expression 2]}$$

where $I_{Cb}$, and $I_{Cr}$ indicate chroma values, (i,j) indicates a current pixel, and (p, q) indicates an adjacent pixel to be determined with respect to purple fringing.

A value of a Cb channel is converted by using Equation 3 by using an adjacent region in which the purple fringing 721 does not occur.

$$I'_{Cb}(i, j) = \sum_{(p,q) \in N'} w_4(p, q) I_{Cb}(p, q), \quad \text{[Equation 3]}$$

where w4 indicates a weight with respect to a distance from the current pixel, and N' indicates the adjacent region in which the purple fringing 721 does not occur.

In this manner, the purple fringing removing unit 251 may restore pixels in a current frame that have the chroma characteristic of the purple fringing 721 to pixels from which the purple fringing 721 is removed, by using a pixel value and an image value as weights, wherein the pixel value is restored from adjacent pixels and the image value is interpolated from a previous image frame.

The image output unit 261 outputs an image from which chromatic aberration and purple fringing are removed.

As described above, according to the present embodiment, chromatic aberration and purple fringing are removed by using a post-processing method, without previous information. Also, according to the present embodiment, information of a previous image frame is used, so that chromatic aberration that occurs in a wide region may be removed.

Figure 9:
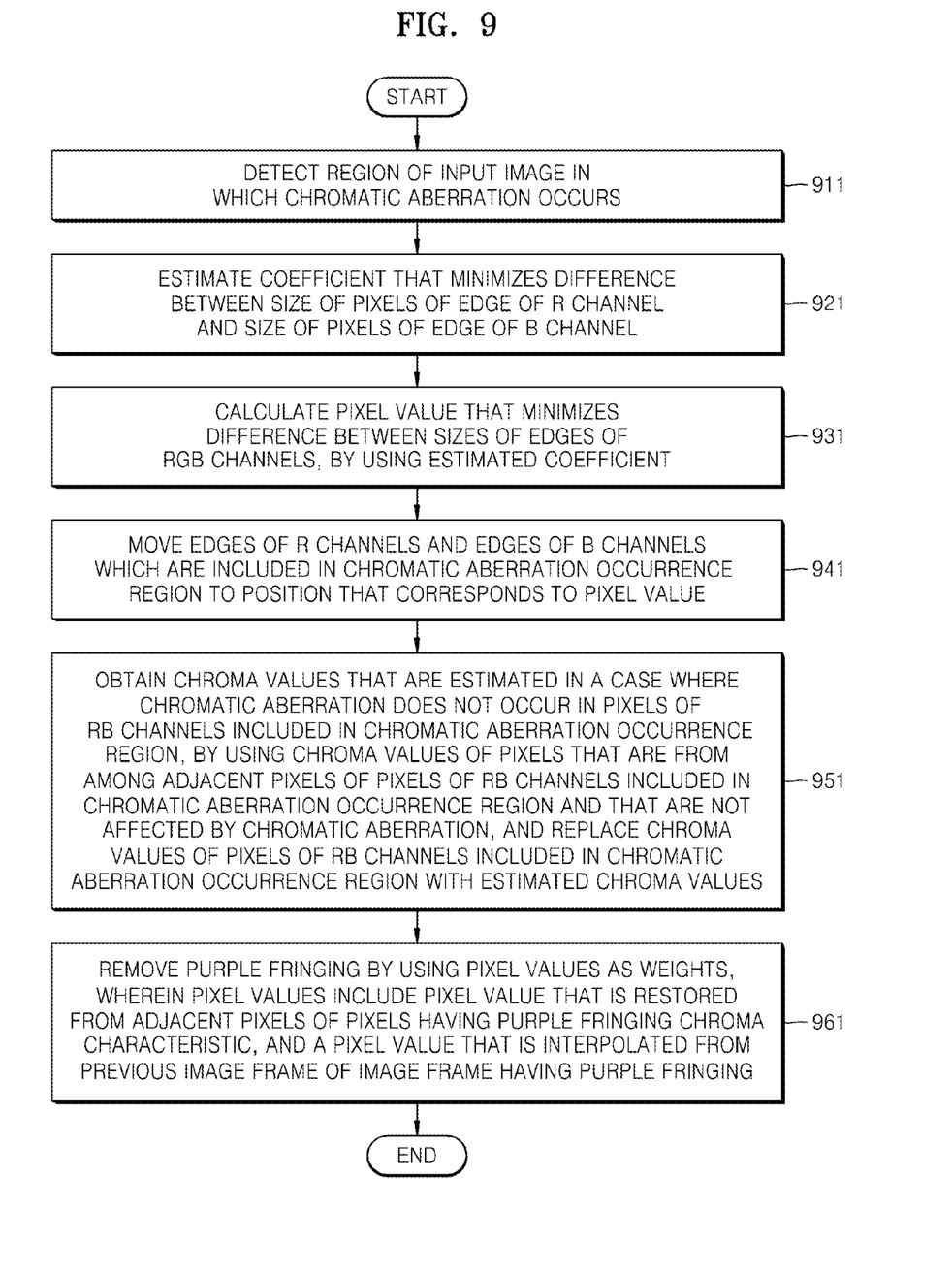
FIG. 9 is a flowchart of a method of removing chromatic aberration, according to an exemplary embodiment.

FIG. 9 is a flowchart of a method of removing chromatic aberration, according to an exemplary embodiment.

In a first operation 911, the method involves detecting a region of an input image in which chromatic aberration occurs.

In a second operation 921, the method involves estimating a coefficient that minimizes a difference between a size of pixels of an edge of an R channel and a size of pixels of an edge of a B channel.

In a third operation 931, the method involves calculating a pixel value that minimizes a difference between sizes of edges of RGB channels, by using the estimated coefficient.

In a fourth operation 941, the method involves moving the edges of the R channels and the edges of the B channels included the chromatic aberration occurrence region to a position that corresponds to the pixel value.

In a fifth operation 951, the method involves obtaining chroma values that are estimated in a case where the chromatic aberration does not occur in pixels of the RB channels included in the chromatic aberration occurrence region, by using chroma values of pixels that are from among pixels adjacent to the pixels of the RB channels included in the chromatic aberration occurrence region and that are not affected by the chromatic aberration, and then, the method involves replacing chroma values of the pixels of the RB channels included in the chromatic aberration occurrence region with the estimated chroma values.

In a sixth operation 961, the method involves removing purple fringing by using pixel values as weights, wherein the pixel values include a pixel value that is restored from pixels adjacent to pixels having a purple fringing chroma characteristic, and a pixel value that is interpolated from a previous image frame of an image frame having the purple fringing.

By using the method, it is possible to remove chromatic aberration and purple fringing that occur in an image generated by capturing a target subject.

As described above, according to the exemplary embodiment, chromatic aberration and purple fringing are removed by using a post-processing method, without previous information.

Also, according to the exemplary embodiment, information of a previous image frame is used, so that chromatic aberration that occurs in a wide region may be removed.

While the inventive concept has been particularly shown and described with reference to exemplary embodiments thereof, it will be understood by those of ordinary skill in the art that various changes in form and details may be made therein without departing from the spirit and scope of the inventive concept as defined by the following claims.

What is claimed is:

1. A chromatic aberration removing device comprising:
   a chromatic aberration region detecting unit which detects a chromatic aberration occurrence region in an input image;
   a coefficient calculating unit which calculates a minimizing pixel value which minimizes a difference between sizes, numbers of pixels or intensities of edges of red, green, and blue (RGB) channels of the chromatic aberration occurrence region; and
   a chroma signal processing unit which removes chromatic aberration in the chromatic aberration occurrence region by using the minimizing pixel value and chroma values of pixels adjacent to the chromatic aberration occurrence region.

2. The chromatic aberration removing device of claim 1, wherein the coefficient calculating unit estimates a minimizing coefficient which minimizes a difference between a size, number or intensity of pixels of the edge of the R channel and a size, number or intensity of pixels of the edge of the B channel, and then, calculates the minimizing pixel value by using the minimizing coefficient.

3. The chromatic aberration removing device of claim 2, wherein the minimizing pixel value is a pixel value (i',j') that satisfies expressions of $\min\|I_G(i,j)-I_R(i',j')\|$, and $\min\|I_G(i,j)-I_B(i',j')\|$, where $(i,j) \in$ Edge region, and is calculated by using an equation of $(i',j')=(i,j)(a_0+a_1 r(i,j)+a_1 r(i,j)^2+a_1 r(i,j)^3)$,
   where $a_0, a_1, a_2, a_3$ indicate size coefficients between the RGB channels.

4. The chromatic aberration removing device of claim 2, wherein the chroma signal processing unit comprises:
   a channel moving unit which moves the edge of the R channel and the edge of the B channel in the chromatic aberration occurrence region to a position corresponding to the minimizing pixel value; and
   a chroma interpolating unit which obtains chroma values which are estimated in a case where the chromatic aberration does not occur in pixels of the RB channels included in the chromatic aberration occurrence region, by using chroma values of pixels which are from among adjacent pixels of the pixels of the RB channels included in the chromatic aberration occurrence region and which are not affected by the chromatic aberration, and replaces chroma values of the pixels of the RB channels in the chromatic aberration occurrence region with the estimated chroma values.

5. The chromatic aberration removing device of claim 4, wherein each of the estimated chroma values $I'_{Cb}(i,j)$ is calculated by using an equation of $$I'_{Cb}(i,j) = \sum_{(p,q) \in N} \frac{S(p,q)}{w_1(p,q) + w_2(p,q) + w_3(p,q)} I_{Cb}(p,q),$$

where Cb indicates chroma, (i,j) indicate pixels in the chromatic aberration occurrence region, (p,q) indicate the adjacent pixels in the chromatic aberration occurrence region, N indicates an adjacent region around the chromatic aberration occurrence region, S indicates a switch function for weighting and averaging only same chroma from among a plurality of pieces of chroma of the adjacent pixels in the chromatic aberration occurrence region, w1 indicates an absolute value of a difference between slopes of the G and B channels, w2 indicates an absolute value of a slope of a Y channel, and w3 indicates a difference between a Y (luminance) value of a pixel in the chromatic aberration occurrence region and Y values of pixels adjacent to the pixel in the chromatic aberration occurrence region.

6. The chromatic aberration removing device of claim 1, wherein the chroma signal processing unit comprises:
   a channel moving unit which moves the edge of the R channel and the edge of the B channel in the chromatic aberration occurrence region to a position corresponding to the minimizing pixel value; and
   a chroma interpolating unit which obtains chroma values which are estimated in a case where the chromatic aberration does not occur in pixels of the RB channels included in the chromatic aberration occurrence region, by using chroma values of pixels which are from among adjacent pixels of the pixels of the RB channels included in the chromatic aberration occurrence region and which are not affected by the chromatic aberration, and replaces chroma values of the pixels of the RB channels in the chromatic aberration occurrence region with the estimated chroma values.

7. The chromatic aberration removing device of claim 1, further comprising:
   a purple fringing removing unit which removes purple fringing by using given pixel values as weights,
   wherein the given pixel values comprise a pixel value which is restored from pixels adjacent to pixels having a purple fringing chroma characteristic, and a pixel value which is interpolated from a previous image frame of an image frame having the purple fringing.

8. The chromatic aberration removing device of claim 7, wherein the coefficient calculating unit estimates a minimizing coefficient which minimizes a difference between a size, number or intensity of pixels of the edge of the R channel and a size, number or intensity of pixels of the edge of the B channel, and then, calculates the minimizing pixel value by using the coefficient.

9. The chromatic aberration removing device of claim 8, wherein the chroma signal processing unit comprises:
   a channel moving unit which moves the edge of the R channel and the edge of the B channel in the chromatic aberration occurrence region to a position corresponding to the minimizing pixel value; and
   a chroma interpolating unit which obtains chroma values which are estimated in a case where the chromatic aberration does not occur in pixels of the RB channels included in the chromatic aberration occurrence region, by using chroma values of pixels which are from among adjacent pixels of the pixels of the RB channels included in the chromatic aberration occurrence region and which are not affected by the chromatic aberration, and replaces chroma values of the pixels of the RB channels in the chromatic aberration occurrence region with the estimated chroma values.

10. The chromatic aberration removing device of claim 7, wherein a purple fringing occurrence region in which the purple fringing occurs is defined as $I_{Cb}>0$ and $I_{Cr}>-th$ and $I_{Cb}>I_{Cr}$, the purple fringing occurrence region and values of adjacent pixels around the purple fringing occurrence region are defined as $I_{Cb}(i,j)>I_{Cb}(p,q)$ and $I_{Cb}(p,q) \leq I_{Cr}(p,q)$, and an interpolated chroma value $I'Cb(i,j)$ of each of pixels in the purple fringing occurrence region is calculated by using an equation of $$I'_{Cb}(i,j) = \sum_{(p,q) \in N'} w_4(p,q) I_{Cb}(p,q),$$

where, w4 indicates a weight according to a distance between the pixels in the purple fringing occurrence region and the adjacent pixels in the purple fringing occurrence region, and N' indicates a region in which the purple fringing does not occur).

11. A method of removing chromatic aberration, the method comprising:
   (a) detecting a region of an input image in which chromatic aberration occurs;
   (b) estimating a minimizing coefficient which minimizes a difference between a size, number or intensity of pixels of an edge of a red (R) channel and a size, number or intensity of pixels of an edge of a blue (B) channel;
   (c) calculating, using a processor and the estimated coefficient, a minimizing pixel value which minimizes a difference between sizes, numbers of pixels or intensities of edges of red, green and blue (RGB) channels;
   (d) moving the edges of the R channels and the edges of the B channels in the chromatic aberration occurrence region, to a position which corresponds to the minimizing pixel value; and
   (e) obtaining chroma values which are estimated in a case where the chromatic aberration does not occur in pixels of the RB channels included in the chromatic aberration occurrence region, by using chroma values of pixels which are from among adjacent pixels of the pixels of the RB channels included in the chromatic aberration occurrence region and which are not affected by the chromatic aberration, and then, replaces chroma values of the pixels of the RB channels included in the chromatic aberration occurrence region with the estimated chroma values.

12. The method of claim 11, further comprising:
   (f) removing purple fringing by using given pixel values as weights, wherein the given pixel values comprise a pixel value which is restored from pixels adjacent to pixels having a purple fringing chroma characteristic, and a pixel value which is interpolated from a previous image frame of an image frame having the purple fringing.

* * * * *